(12) United States Patent
Asaad et al.

(10) Patent No.: US 9,177,006 B2
(45) Date of Patent: Nov. 3, 2015

(54) RADIX SORT WITH READ-ONLY KEY

(71) Applicant: International Business Machines Corporation, Armonk, NY (US)

(72) Inventors: Sameh W. Asaad, Briarcliff Manor, NY (US); Hong Min, Poughkeepsie, NY (US); Bharat Sukhwani, Briarcliff Manor, NY (US); Mathew S. Thoennes, West Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 13/730,902

(22) Filed: Dec. 29, 2012

(65) Prior Publication Data

US 2014/0188908 A1 Jul. 3, 2014

(51) Int. Cl.
*G06F 17/30* (2006.01)

(52) U.S. Cl.
CPC .................. *G06F 17/30345* (2013.01)

(58) Field of Classification Search
None
See application file for complete search history.

(56) References Cited

U.S. PATENT DOCUMENTS

| | | | | |
|---|---|---|---|---|
| 5,396,622 | A * | 3/1995 | Lee et al. ............................. | 1/1 |
| 5,440,734 | A * | 8/1995 | Wagar ................................ | 1/1 |
| 5,546,390 | A * | 8/1996 | Stone ................................. | 370/408 |
| 5,873,078 | A | 2/1999 | Angle et al. | |
| 5,924,091 | A | 7/1999 | Burkhard | |
| 6,351,758 | B1 * | 2/2002 | Courtney et al. ............ | 708/404 |
| 7,446,681 | B2 * | 11/2008 | Gunther ....................... | 341/106 |
| 7,624,107 | B1 | 11/2009 | Le Grand | |
| 7,680,791 | B2 * | 3/2010 | Callaghan et al. ..... | 707/999.007 |
| 7,689,541 | B1 | 3/2010 | Le Grand | |
| 7,801,903 | B2 * | 9/2010 | Furusho ....................... | 707/752 |
| 7,870,159 | B2 | 1/2011 | Carroll | |
| 8,065,337 | B2 * | 11/2011 | Furusho ....................... | 707/796 |
| 8,094,157 | B1 | 1/2012 | Le Grand | |
| 8,515,976 | B2 * | 8/2013 | Shinjo et al. ................. | 707/753 |
| 8,761,166 | B2 * | 6/2014 | Scott et al. ................... | 370/389 |
| 2006/0161546 | A1 | 7/2006 | Callaghan et al. | |
| 2010/0312802 | A1 * | 12/2010 | Furusho ....................... | 707/803 |
| 2011/0051724 | A1 * | 3/2011 | Scott et al. ................... | 370/389 |
| 2012/0095591 | A1 * | 4/2012 | Wilson ......................... | 700/214 |

(Continued)

FOREIGN PATENT DOCUMENTS

| | | |
|---|---|---|
| CN | 101567781 A | 10/2009 |
| CN | 102278990 A | 12/2011 |
| EP | 2144173 | 1/2010 |

OTHER PUBLICATIONS

Van Voorhis, David C., "A Generalization of the Divide-Sort-Merge Strategy for Sorting Networks," Technical Report No. 16, Digital Systems Laboratory, Stanford Electronics Laboratories, Computer Science Department, Stanford University, Stanford, California, USA, Aug. 1971, 87 pages, IP.com No. IPCOM00150558D.

(Continued)

*Primary Examiner* — Richard Bowen
(74) *Attorney, Agent, or Firm* — Ference & Associates LLC

(57) ABSTRACT

Methods and arrangements for a radix sort with a read only key. A plurality of keys are received, an array and a link table are populated for the first digit of the keys based upon the keys; and an array and a link table are populated for each successive digit of the keys based upon the array and link table populated for the preceding digit of the keys. Embodiments may be implemented in both hardware (FPGAs, ASICs, information handling devices, etc.) and software. Other embodiments are also disclosed and claimed.

17 Claims, 13 Drawing Sheets

(56) References Cited

U.S. PATENT DOCUMENTS

2013/0035782 A1* 2/2013 Norris et al. .................. 700/224
2014/0188906 A1* 7/2014 Muller et al. .................. 707/752

OTHER PUBLICATIONS

IBM, "MinMaxDifference sorting algorithm," Dec. 9, 2009, 5 pages, IP.com No. IPCOM000190634D.

Franceschini, Gianni et al., "Radix Sorting With No Extra Space," Submitted to ESA 2007, Jun. 27, 2007, pp. 1-17. A copy can be found at http://arxiv.org/pdf/0706.4107v1.pdf as of Feb. 7, 2013.

Ha, Linh et al., "Implicit radix sorting on GPUs," Jul. 27, 2010, Scientific Computing and Imaging Institute, University of Utah, Salt Lake City, Utah, USA.

Koch, Dirk et al., "FPGASort: A High Performance Sorting Architecture Exploiting Run-time Reconfiguration on FPGAs for Large Problem Sorting," FPGA'11, Monterey, California, USA, Feb. 27-Mar. 1, 2011, pp. 45-54, ACM Digital Library.

Andersson, Arne et al., "Sorting in Linear Time?" STOC'95 Las Vegas, Nevada, USA, May 29-Jun. 1, 1995, pp. 427-436, ACM Digital Library.

Katajainen, Jyrki et al., "Sorting Multisets Stably in Minumum Space," Proceedings of the 3rd Scandinavian Workshop on Algorithm Theory, Helsinki, Finland, Jul. 1992, 16 Pages.

Ha, Linh et al., "Fast 4-way parallel radix sorting on GPUs," Feb. 2009, 11 pages. Copy available at http://www/sci.utah.edu/~csilva/papers.cgf.pdf as of Feb. 7, 2013.

Ben-Amram, Amir M. et al., "When can we sort in o(n log n) time?" Proceedings of the 34th Annual Symposium on Foundations of Computer Science, Palo Alto, California, USA, Nov. 3-5, 1993, pp. 538-546, IEEE Xplore Digital Library.

Katajainen, Jyrki et al., "Stable Minimum Space Partitioning in Linear Time," BIT Numerical Mathematics, 1992, pp. 580-585, vol. 32, Issue 4, SpringerLink Digital Library.

* cited by examiner

1st Digit Fill

Case 1 – First time "Digits" seen

| Receive Key | Access Tail | Write Head / Write Tail / Write Link | Receive Key | Access Tail | Write Head / Write Tail / Write Link | Access Tail | Write Head / Write Tail / Write Link |

Case 2 – If "Digits" previously seen

| Receive Key | Access Tail | Write Tail / Write Link / Write Link | Receive Key | Access Tail | Write Tail / Write Link / Write Link | Access Tail | Write Tail / Write Link / Write Link |

FIG. 4

Next Digit Fill

Case 1 – First time "Digit" seen

| Access Key | Empty | Write Head / Write Tail / Write Link | | |
|---|---|---|---|---|
| | Access Key | Access Tail | Write Head / Write Tail / Write Link | |
| | | Access Key | Access Tail | Write Head / Write Tail / Write Link |

Case 2 – If "Digit" previously seen

| Access Key | Access Tail | Write Tail / Write Link / Write Link | | |
|---|---|---|---|---|
| | Access Key | Access Tail | Write Tail / Write Link / Write Link | |
| | | Access Key | Access Tail | Write Tail / Write Link / Write Link |

FIG. 7

RADIX SORT WITH READ-ONLY KEY

BACKGROUND

Sorting is generally acknowledged to be one of the most time-consuming computer-implemented procedures. It has been estimated that over twenty-five percent (25%) of all computer running time is devoted to sorting. Many installations use over half of their available computer time for sorting. Numerous proposals and improvements have been disclosed in the art for the purposes for reducing sorting time and increasing sorting efficiency.

There are various known sorting schemes, one of which is a radix sort. In general terms, a radix sort is a non-comparative integer sorting algorithm that sorts data with integer keys by grouping keys by the individual digits which share the significant position and value. A positional notation is required, but because integers can represent strings of characters (e.g., names or dates) and specially formatted floating point numbers, radix sort is not limited to integers.

Issues with implementing a radix sort include trade offs of time vs. memory space required for the sort. For example, in the counting sort variety, the space required is $2(M*L)$, and the time required is $2(M*W)$, where M is the number of keys, L is the length of keys, and W is the number of digits in key. In the naïve variety, time is reduced to $M*W$, however, space required increases and becomes $2(|D|*M*L)$, where $|D|$ is the cardinality of digit.

BRIEF SUMMARY

In summary, one aspect of the invention provides a method of implementing a radix sort, the method comprising receiving a plurality of keys to be sorted in a radix sort; and operating at least one processor to: populate an array and a link table for the first digit of the keys based upon the keys; populate an array and a link table for each successive digit of the keys based upon the array and link table populated for the preceding digit of the keys; and produce a final radix sort of the keys based on an array and a link table.

Another aspect of the invention provides an apparatus for implementing a radix sort, the apparatus comprising one or more processors; and a memory operatively coupled to the one or more processors that stores instructions executable by the one or more processors to perform acts comprising: receiving a plurality of keys to be sorted in a radix sort; and populating an array and a link table for the first digit of the keys based upon the keys; populating an array and a link table for each successive digit of the keys based upon the array and link table populated for the preceding digit of the keys; and producing a final radix sort of the keys based on an array and a link table.

A further aspect of the invention provides an apparatus comprising at least one programmable logic device (PLD) containing programmable circuit elements; said programmable circuit elements being configured to: receive a plurality of keys to be sorted in a radix sort; populate an array and a link table for the first digit of the keys based upon the keys; populate an array and a link table for each successive digit of the keys based upon the array and link table populated for the preceding digit of the keys; and produce a final radix sort of the keys based on an array and a link table.

An additional aspect of the invention provides a computer program product comprising a computer readable storage medium having computer readable program code embodied therewith, the computer readable program code comprising: computer readable program code configured to receive a plurality of keys to be sorted in a radix sort; and computer readable program code configured to populate an array and a link table for the first digit of the keys based upon the keys; computer readable program code configured to populate an array and a link table for each successive digit of the keys based upon the array and link table populated for the preceding digit of the keys; and computer readable program code configured to produce a final radix sort of the keys based on an array and a link table.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 sets forth the timing and process for a first digit fill in accordance with an embodiment.

FIG. 7 sets forth the timing and process for filling the remaining digits (next digit fill) in accordance with an embodiment.

DETAILED DESCRIPTION

Figure 1:
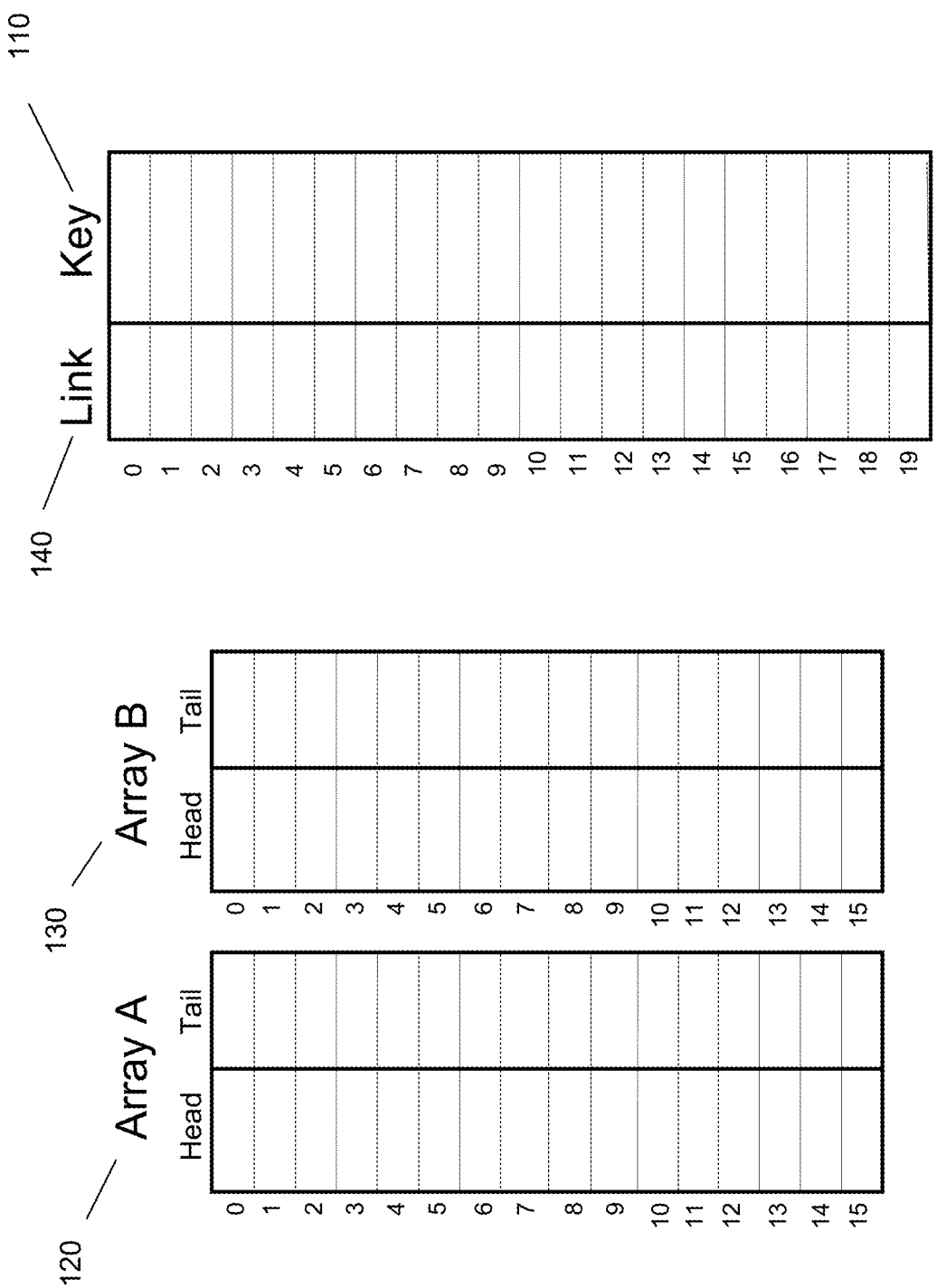
FIG. 1 schematically illustrates the format of the information to be stored in an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected example embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems (such as field programmable gate arrays (FPGAs) or application specific integrated circuits (ASICs)) that perform the specified functions or acts, or combinations of special purpose hardware and computer instructions.

Specific reference will now be made herebelow to FIGS. 1 and 8. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 10. In accordance with an example embodiment, most if not all of the process steps, components and outputs discussed with respect to FIGS. 1-8 can be performed or utilized by way of a processing unit or units and system memory such as those indicated, respectively, at 16' and 28' in FIG. 10, whether on a server computer, a client computer, a node computer in a distributed network, or any combination thereof. In one embodiment, the processing steps described herein may be implemented on a single field programmable gate array (FPGA) by virtue of the storage savings offered.

Figure 8:
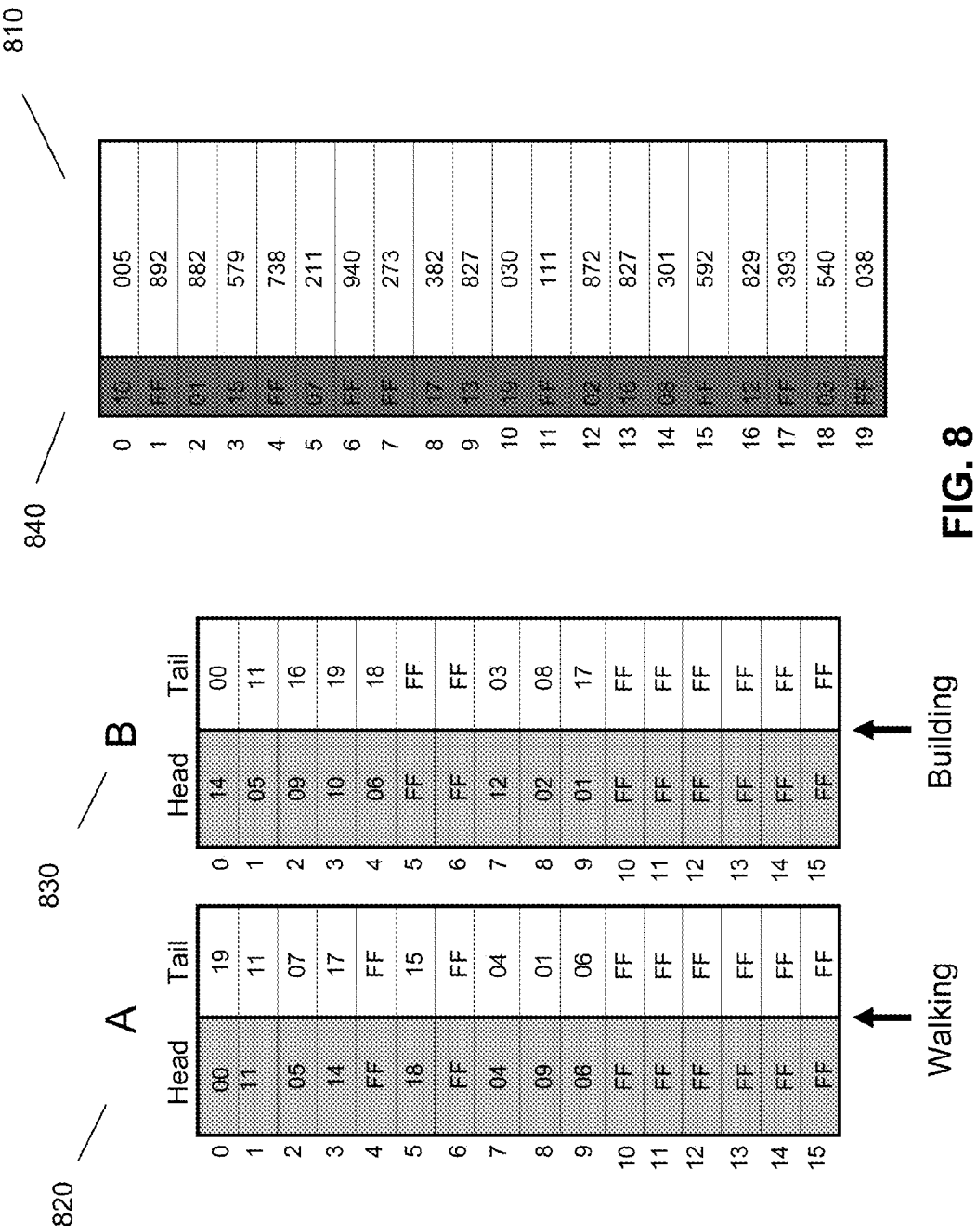
FIG. 8 schematically illustrates the implementation of an embodiment for the third digit.

To facilitate easier reference, in advancing from FIG. 1 to and through FIG. 8, a reference numeral is advanced by a multiple of 100 in indicating a substantially similar or analogous component or element with respect to at least one component or element found in FIG. 1.

Broadly contemplated herein, in accordance with at least one embodiment of the invention, are methods and arrangements for conducting a radix sort which maintains the time required for a naïve radix sort but which needs significantly less space. For example, in one embodiment the amount of storage needed is a small incremental amount beyond the amount required for key storage. By way of non-limiting example, additional storage may be calculated as M(log M*(M+4*Cardinality))/8, where M is the number of keys.

When M=64,000 keys, the keys size is 64 bits, the Cardinality is 256, the keys require 4 MB of storage, and the additional storage required is 133 KB, which is an overhead of approximately 3.3%. Unlike some of the previous art, no copying of keys is required during the sort, and no encoding of keys is required. Furthermore, in accordance with embodiments, a single pass is made through the keys and the keys are not modified. Moreover, pipeline implementation is supported.

In accordance with at least one embodiment of the invention, and as shown in FIG. 1, a link list data structure is implemented. In addition to the key array shown at 110, two additional arrays (120, 130) are used, together with a link list (140). Although additional arrays and multiple link lists may be used, it is preferred to use two arrays and one link list. In an embodiment the two arrays used are alternated for each successive digit of a key and the link list is shared (e.g., once a value is read for one array from the link list the value may be overwritten with a value associated with the second array). It should be noted as shown in FIG. 1, it is contemplated there is a set of twenty (20) keys, however, this is for illustrative purposes only and in implementation the number of keys may be significantly higher. It should also be noted that the two arrays (120, 130) are configured to contain sixteen elements in a column, consistent with hexadecimal (0-F) practice, however, any number of elements may be used as is appropriate.

Figure 2:
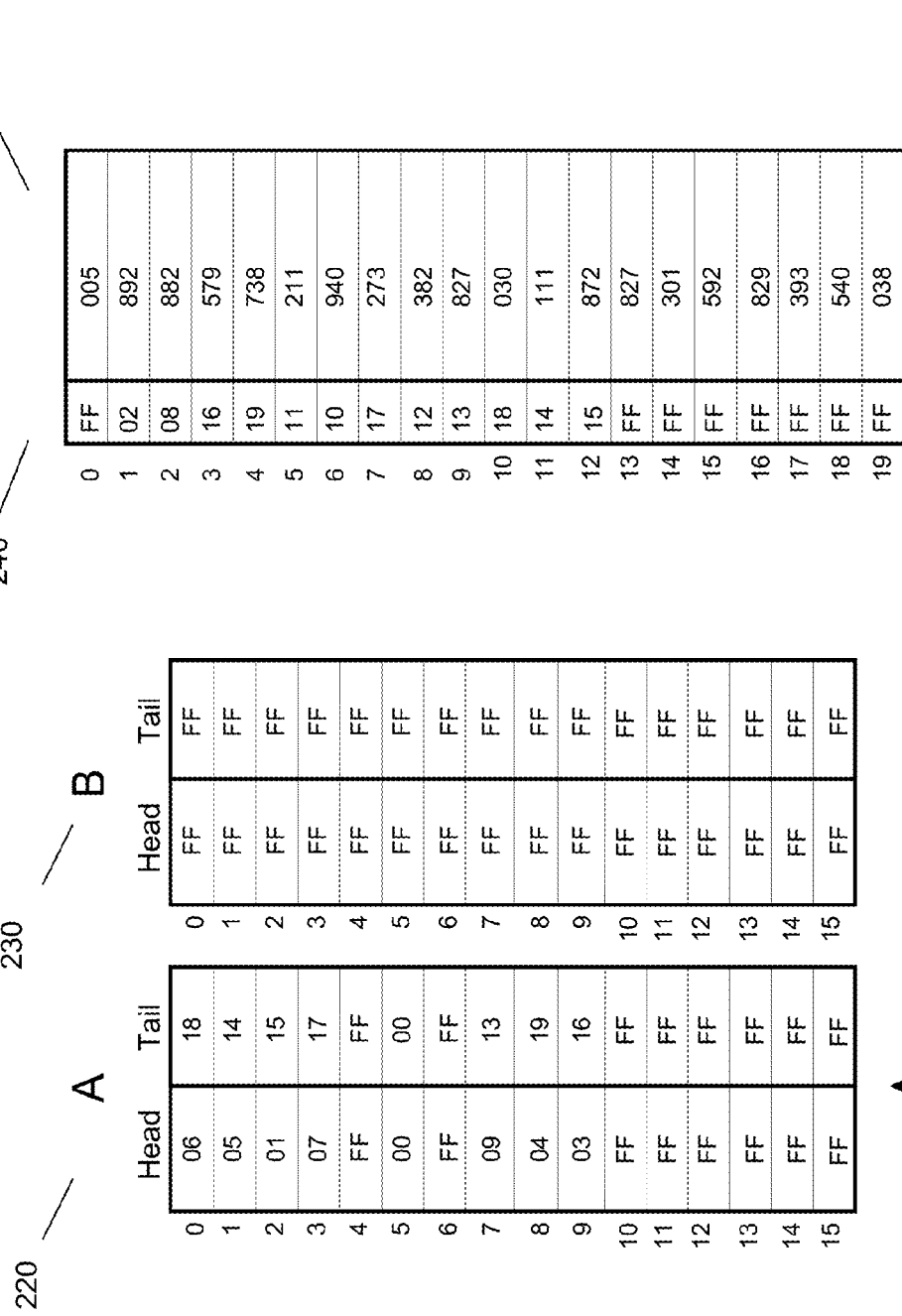
FIG. 2 schematically illustrates the implementation of an embodiment for the first digit.

Referring to FIG. 2, there is shown an implementation for an embodiment of the invention. The keys are shown at 210, the first array at 220 (which is the only array populated at this point), the second array at 230, and the link list for array A (220) at 240. As shown in array A, the digits used are in hexadecimal although no key contains a hexadecimal digit, thus a null or termination character (shown as FF, although any suitable null or termination character may be used) populates the remainder of the array. Digits of any base may be used, although the size of the arrays may be adjusted, e.g., for base 10 digits six of the slots in the head/tail arrays illustrated in the figures could be eliminated. "Digit(s)" as used herein are defined as key values, e.g., in FIG. 2, the first key is "0" and its "digit" (initial digit of interest) is "5" (from "005"). Other like values and terms may be applied, as "digit" and "key" are used as representative terms herein.

To populate Array A, the first digit of interest of the keys is used (as shown, the right most or least significant digit (LCD), although other digits may be used depending on the type of radix sort to be implemented). Starting with a digit value of 0 (the first entry in Array A), the first appearance in the first digit of the keys is in element 6 ("940"), thus, the "head" entry for 0 in Array A is 06. The next occurrence of 0 in the first digit of the keys is in element 10 ("030"). The link for element 6 is thus populated with a "10" and the "tail" entry for 0 in Array A is set to "10". The next (third) occurrence of 0 in the first digit of the keys is in element 18 ("540"), so the link for element 10 (the "tail") is thus populated with a "18" and the "tail" entry for 0 in Array A is also populated with "18". Since the final occurrence of 0 in the first digit of the keys is '540' (element 18), the link for element 18 is thus populated with a suitable null or termination character ("FF" as shown) and the "tail" entry for 0 in Array A is 18. Repeating this for 1-9 in the first digit of the keys populates Array A (220) and link list (240) as shown. Array B (230) will be used for the second digit of the keys and is shown as being populated with a suitable null or termination character ("FF").

Figure 3:
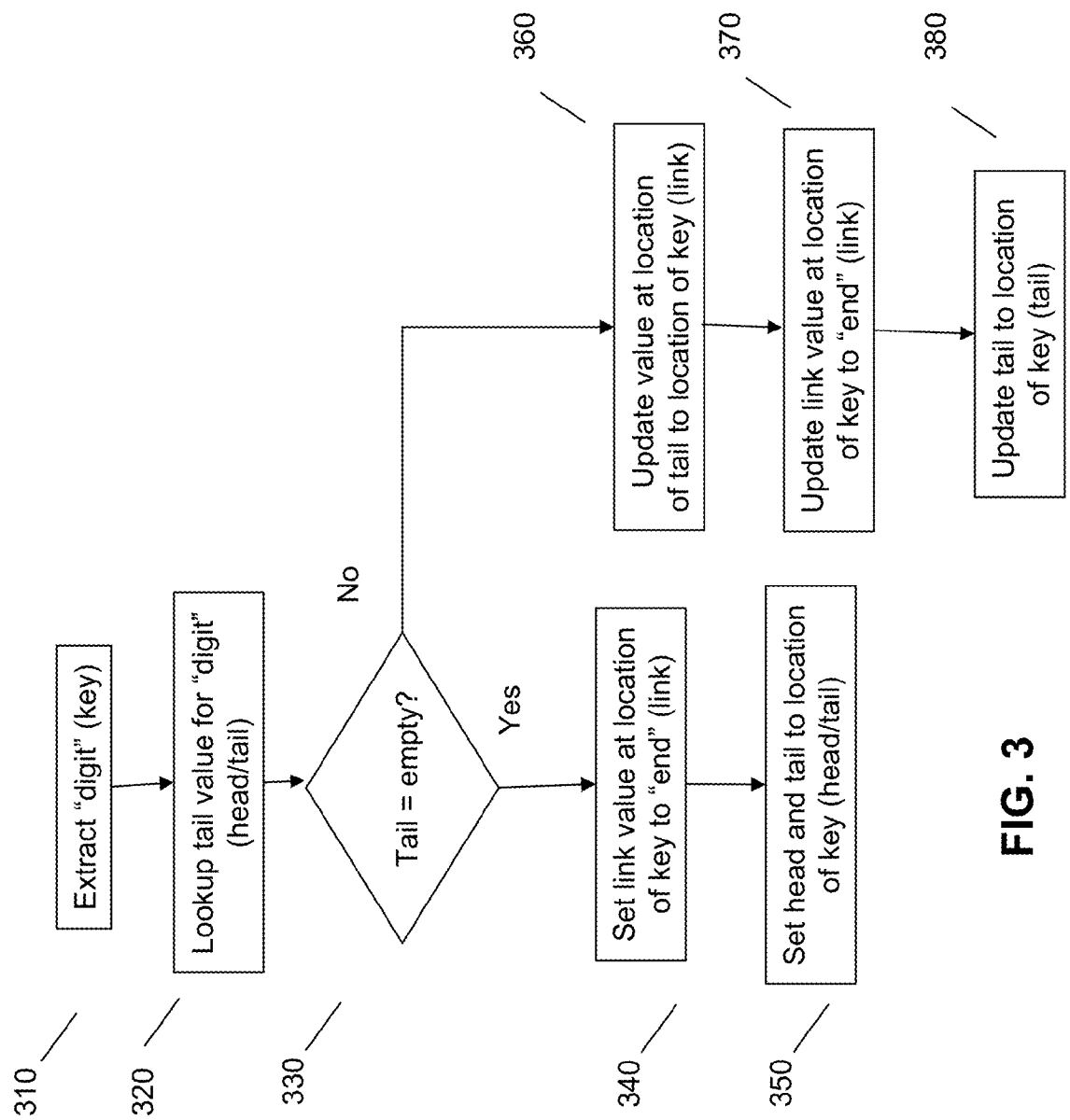
FIG. 3 sets forth a process for the initial population for first digit.

Referring now to FIG. 3, a flow chart is shown illustrating, in accordance with one embodiment of the invention, the initial population for each new key. At 310, the "digit" is extracted (e.g., for key "6", the "digit" extracted is "0") and at 320 the tail value for the digit is looked up (in Array A). At 330 it is determined if the tail is empty. If the tail is empty, at 340 the link value (240 in FIG. 2) at the location of the key is set to "end", which may be a suitable null or termination character (e.g., FF). At 350, the head and tail location (in Array A) of the key is set. If the tail is not empty, at 360 the value at the location of the tail is updated to the location of the key (link) (e.g., 10 in the example of key 6 linking to key 10). At 370 the link value at the location of the last key containing the digit of interest (here, key 18) is updated to end (e.g., FF), and at 380 the tail (in Array A) is updated to the location of the last key (18). Thus, the head and tail value of Array A is populated with the values of 06 and 18, i.e., the first key and last key having the digit of interest.

Referring now to FIG. 4, the operations for the initial fill are shown. As noted thereon, there are two cases—Case 1 is for the first time "digits" are seen and Case 2 is if "digits" have been previously seen. The worst case access pattern for Case 1 is 2 accesses of the tail array, 1 access of the head array, and 1 access of the link array. The worst case access pattern for Case 2 is 2 access of the tail array and 2 access for the link array. In some embodiments, it may be necessary for a tail pointer bypass for the case where the next key has same value and needs to read the value being written.

Figure 5:
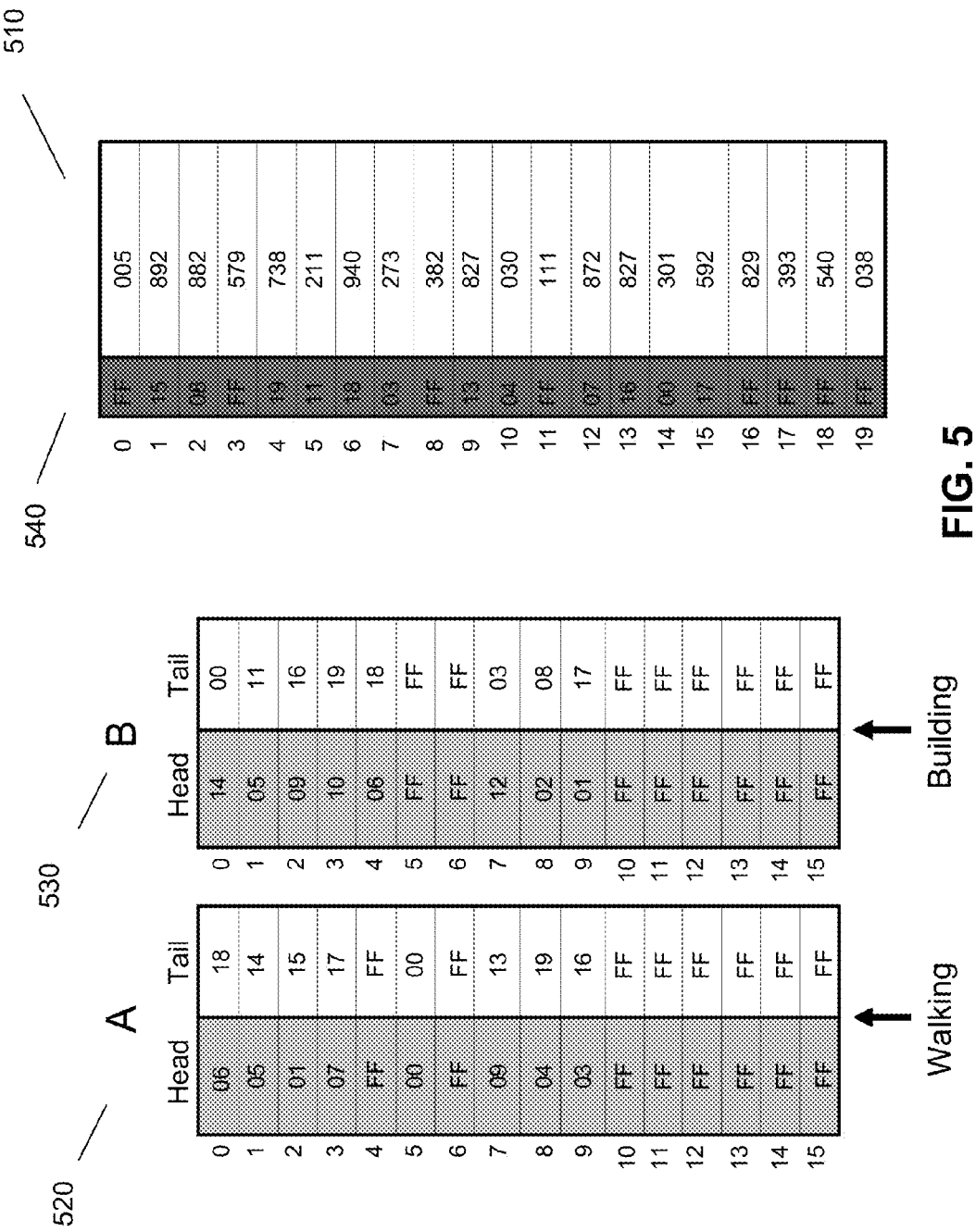
FIG. 5 schematically illustrates the implementation of an embodiment for the second digit.

Referring now to FIG. 5, there is shown an implementation for an embodiment of the invention for the second digit. The keys are shown at 510 (which is equivalent to 210), the first array at 520 (which was populated per FIG. 2), the second array at 530, and the link list for array B (530) at 540. Thus, the keys 510 are the same as keys 210, and Array A 520 is the same as 220. Array B 530 is populated for the second digit, and link list 540 is specific for the second digit. Array B 530 is populated in a manner similar as to how Array A 220/520 was populated, however, Array B 530 is populated by walking Array A, which acts as a pointer to keys 510.

Array A is walked using the head entry, link entry, and tail entry for the first digit (see FIG. 2). The second digit is examined and is processed based on the value as discussed below (see FIG. 6). As illustrated in FIG. 5, the first 0 appears at key 06. The link entry for key 06 is 10, and then the second digit of key 10 is examined. This process is repeated for the various digits, and results in the first occurrence of 0 in the second digit in Array A being 301, which is key 14. Thus, the head for 0 in Array B (530) is '14'. As the next and last occurrence of '0' in the second digit of Array A is 005 (key 00), the tail of 0 in Array B (530) is '00' and the link (540) for key 00 is set to a null or termination character ('FF' as shown). In the absence of Array A (220/520), the reordered keys (shown below in Table 1) would need to be stored, increasing the amount of space needed for the sort.

TABLE 1

940
030
540
211
111
301
892
882
382
872
592
273
393
005
827
827
738

TABLE 1-continued 038
579
829

Figure 6:
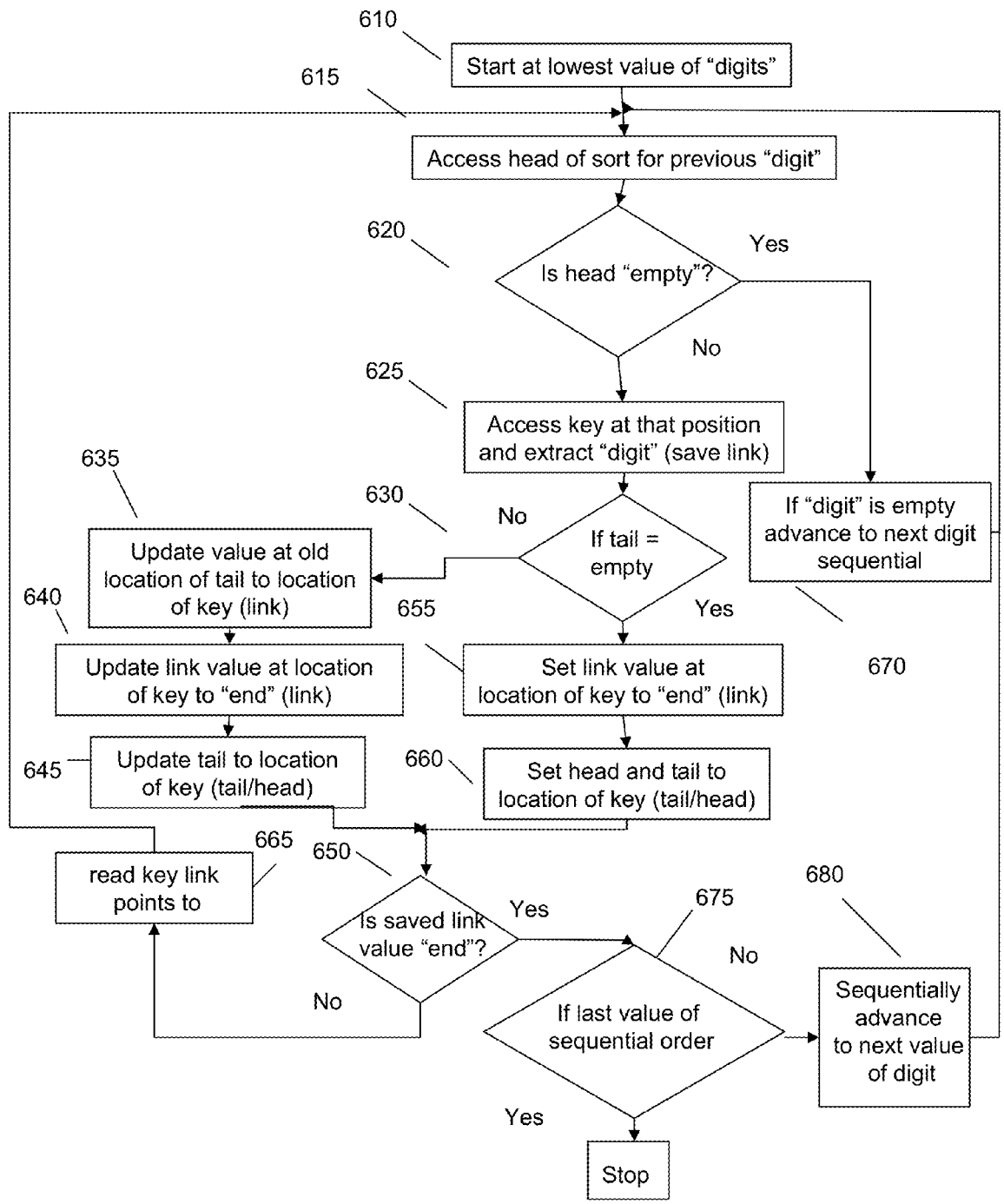
FIG. 6 sets forth a process for the processing of remaining digits in a key.

Referring now to FIG. 6, a flow chart is shown illustrating, in accordance with one embodiment, the processing of remaining "digits" in a key. At 610, the process starts at the lowest value of "digits" in the array (e.g., Array A). At 615, the head of the sort for the previous digit is accessed. At 620, it is determined if that is empty. If not, at 625 the key is accessed at that position and the "digit" extracted (save link). At 630, the tail value for the "digit" in the current table/array (head/tail) is looked up and it is determined if the tail value is empty. If the tail value is empty, at 655 the link value at the location of key is set to "end" (link) and at 660 the head and tail value is set to the location of the key (tail/head). At 650, if the link value saved is not "end", the key it points to is read (665) and the process is repeated. If, at 650, the link value saved is "end", at 675 it is determined if the last value of sequential order. If yes, the process stops. If not, at 680 it is sequentially advanced to the next value of the "digit" and the process is repeated. If at 620 the value is empty, at 670 the "digit" is advanced to the next sequential "digit" and the process is repeated. If at 630 the tail is not empty, at 635 the value at the old location of tail is updated to location of key. At 640 the link value at the location of the key is updated to "end", and at 645 the tail location is updated to location of key. At 650, if the link value saved is not "end", the key it points to is read (665) and the process is repeated. If, at 650, the link value saved is "end", at 675 it is determined if the last value of sequential order. If yes, the process stops. If not, at 680 it is sequentially advanced to the next value of the "digit" and the process is repeated.

Referring now to FIG. 7, the operations for the subsequent fill are shown. As noted thereon, there are two cases—Case 1 is for the first time "digits" are seen and Case 2 is if "digits" have been previously seen. The worst case access pattern for Case 1 is 1 access of the key array, 2 accesses of the tail array, 1 access of the head array, and 1 accesses of the link array. The worst case access pattern for Case 2 is 1 access of the key array, 2 accesses of the tail array, and 2 access of the link array. In some embodiments, it may be necessary to bypass a tail pointer write for the case where the next key has same value and needs to read the value being written.

Referring now to FIG. 8, there is shown an implementation for an embodiment of the invention for the third digit. The keys are shown at 810 (which is equivalent to 510/210), the first array A 820 (which is now populated for the third digit), the second array at 830 (which was populated in FIG. 5), and the link list for array A (820) at 840. Thus, the keys 810 are the same as keys 510/210, and Array B 820 is the same as 520. Array A 820 is populated for the third digit, and link list 840 is specific for the third digit. Array A 830 is populated in a manner similar as to how the previous arrays were populated, however, Array A 820 is populated by "walking" Array B (830), which acts as a pointer to keys 810.

Array B is walked using the head entry, link entry, and tail entry for the second digit (see FIG. 5). The second digit is examined and processed based on the value, as previously discussed (see FIG. 6). In the absence of Array B (530/830), the reordered keys (shown below in Table 2) would need to be stored, increasing the amount of space needed for the sort.

TABLE 2

| |
|---|
| 301 |
| 005 |
| 211 |
| 111 |
| 827 |
| 827 |
| 829 |
| 030 |
| 738 |
| 038 |
| 940 |
| 540 |
| 872 |
| 273 |
| 579 |
| 882 |
| 382 |
| 892 |
| 592 |
| 393 |

This "flipping" of the arrays may continue for as long as needed. At the end of the process, the last array would then be walked to obtain the keys in sorted order. Walking Array A (820), using link list 840, results in the sort order shown in the following table.

TABLE 3

| |
|---|
| 005 |
| 030 |
| 038 |
| 111 |
| 211 |
| 273 |
| 301 |
| 382 |
| 393 |
| 540 |
| 579 |
| 592 |
| 738 |
| 827 |
| 827 |
| 829 |
| 872 |
| 882 |
| 892 |
| 940 |

Figure 9:
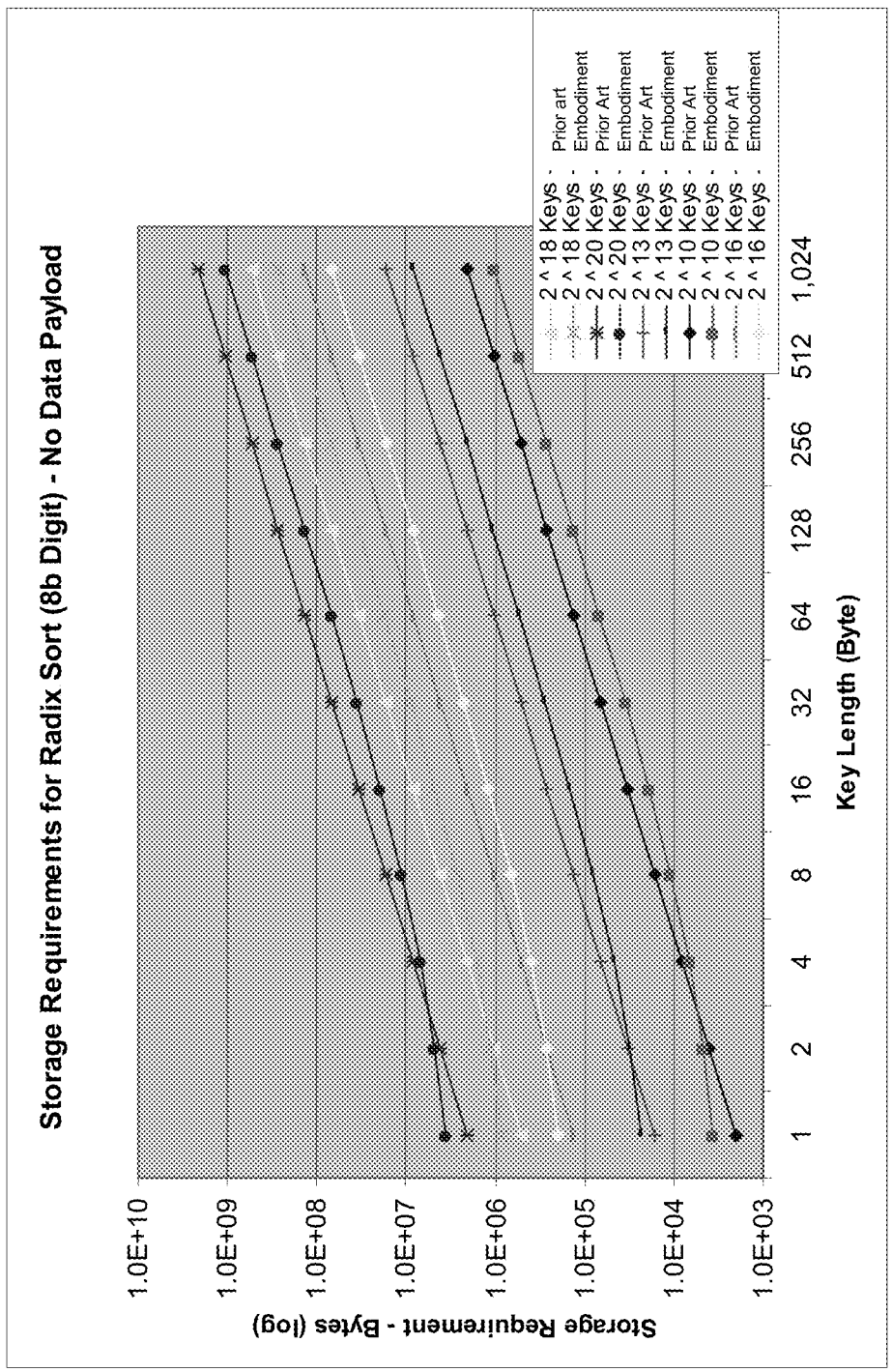
FIG. 9 illustrates the storage requirements of an embodiment as a function of key lengths.

Referring now to FIG. 9, a graph is shown which illustrates the storage requirements for an embodiments against the storage requirements for a prior art radix sort (i.e., a counting sort) as a function of key length.

Figure 10:
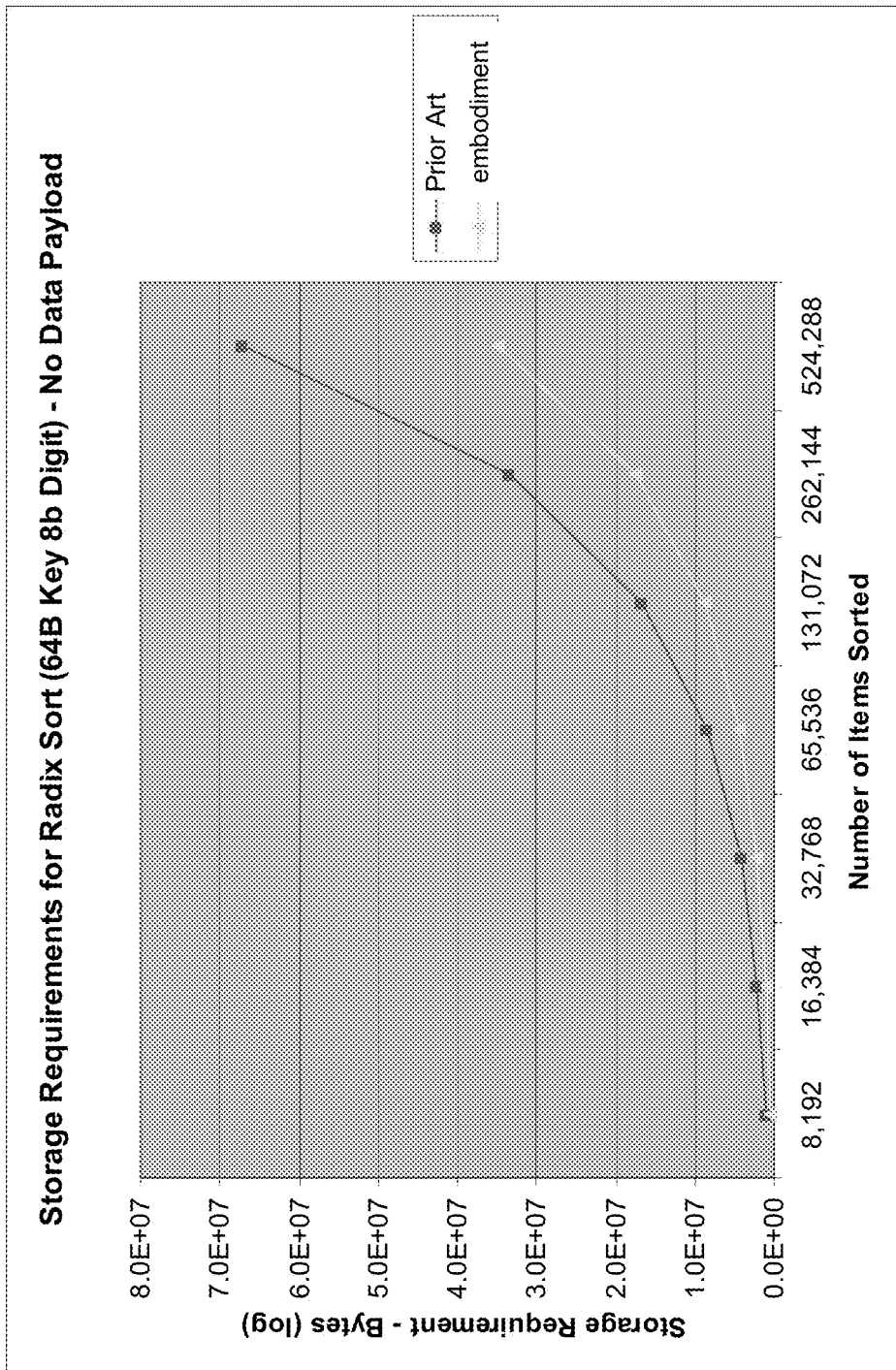
FIG. 10 illustrates the storage requirements of an embodiment as a function of number of items sorted.

Referring now to FIG. 10, a graph is shown which illustrates the storage requirements for an embodiment against the storage requirements for a prior art implementation of a radix sort (i.e., a counting sort) as a function of the number of items sorted.

Figure 11:
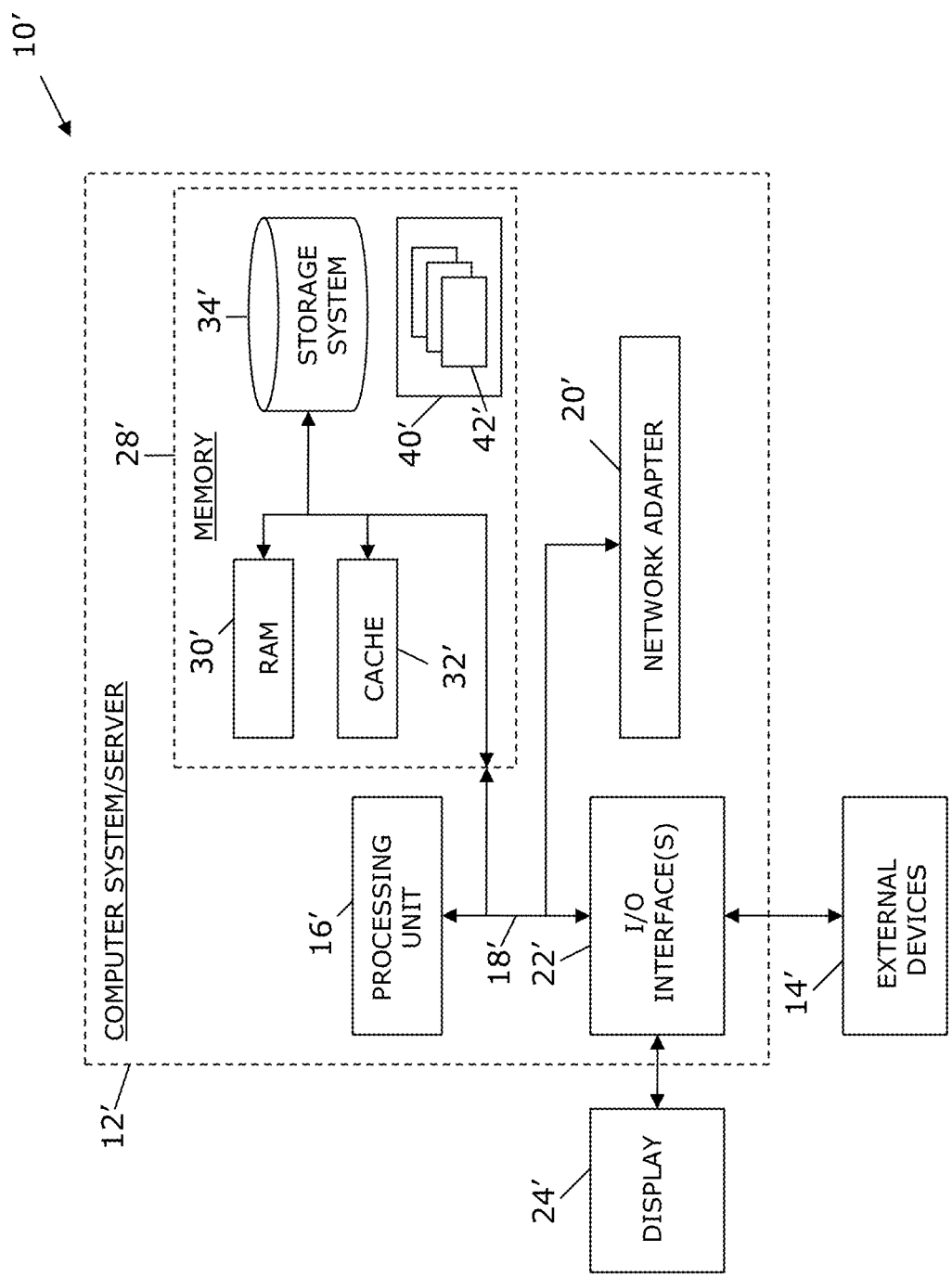
FIG. 11 illustrates a computer system.

Referring now to FIG. 11, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

Figure 12:
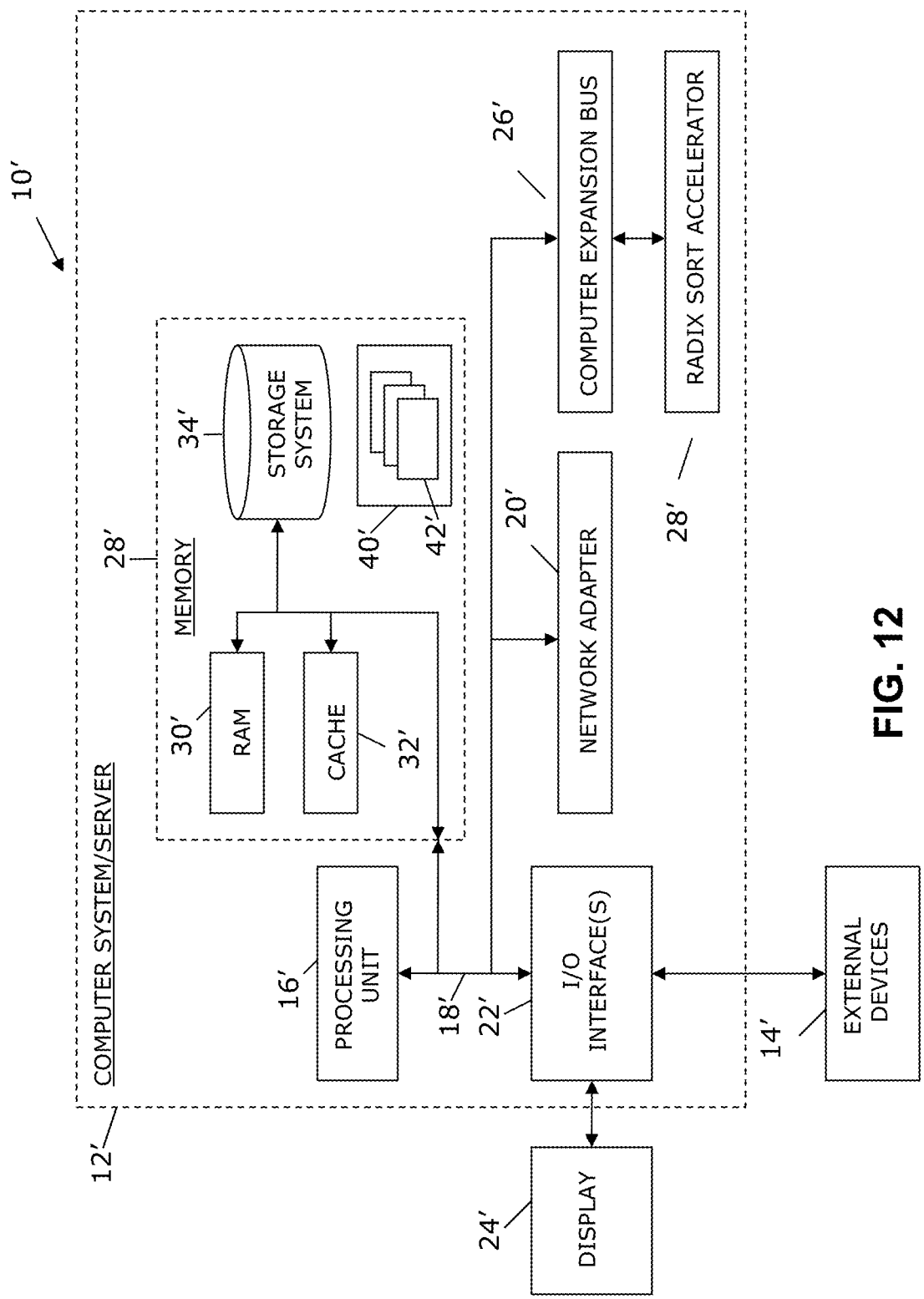
FIG. 12 illustrates a computer system with a computer expansion bus and a radix sort accelerator connected thereto.
Figure 13:
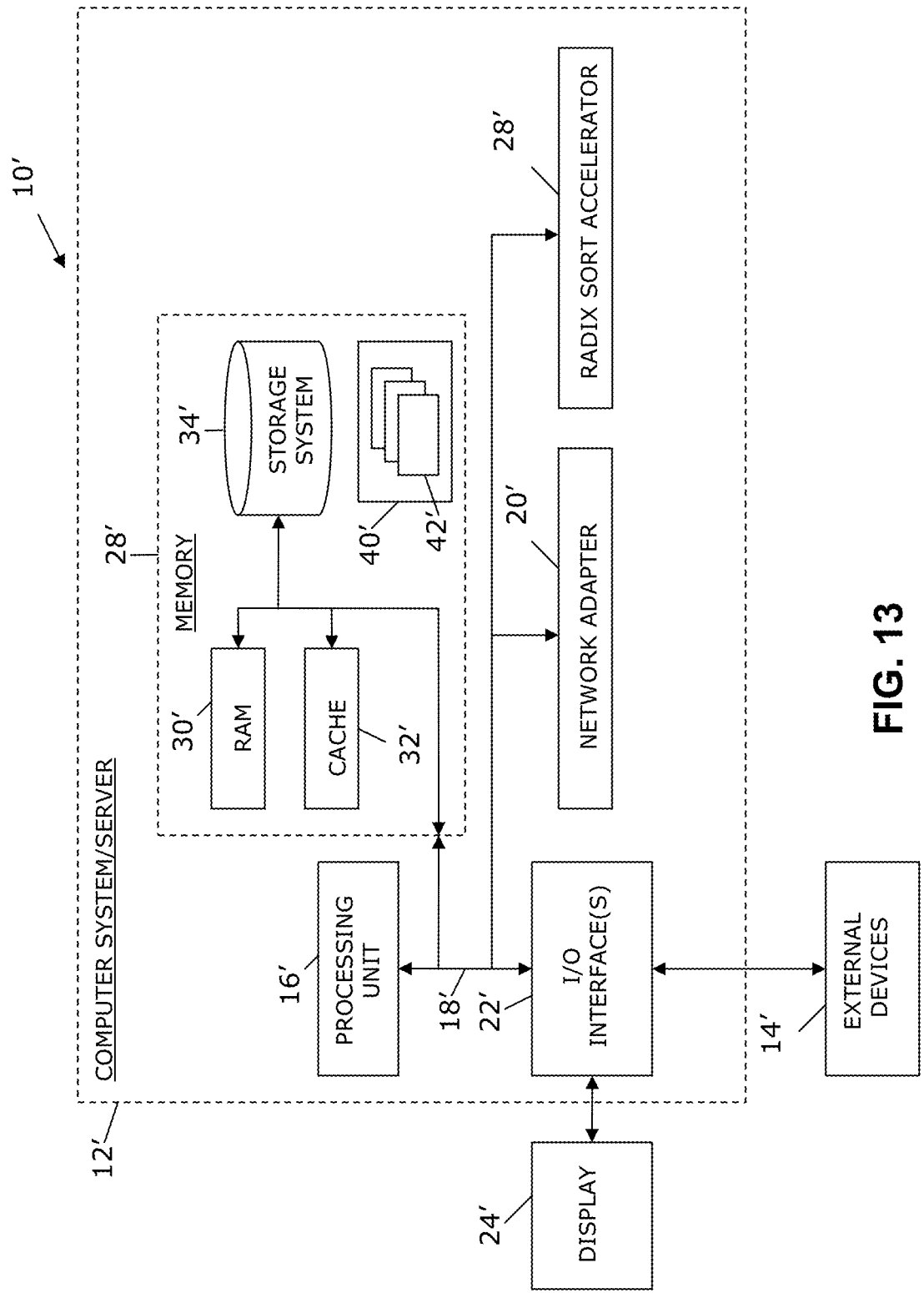
FIG. 13 illustrates a computer system having a radix sort accelerator.

FIGS. 12 and 13 are similar to FIG. 11, and like components are marked with the same reference numerals. Embodiments include algorithm implementations in hardware. As such, FIG. 12 additionally includes a computer expansion bus (26') which connects to a radix sort accelerator (28'). In FIG. 13, radix sort accelerator (28') is not connected through a computer expansion bus.

Such a radix sort accelerator may be implemented in hardware in any suitable manner, including a programmable logic devices (PLDs) such as a field programmable gate array (FPGA) or application specific integrated circuit (ASIC). Moreover, an embodiment includes a parallel implementation where the keys are grouped and each group is sorted (for example, each group is sorted on a different radix sort accelerator) and then a merge sort is performed at the end. A parallel implementation has certain speed and storage area benefits.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus for implementing a radix sort, the apparatus comprising:
   one or more processors; and
   a memory operatively coupled to the one or more processors that stores instructions executable by the one or more processors to perform acts comprising:
   receiving a plurality of keys to be sorted in a radix sort;
   populating a first array and a first link list for a first digit of the keys based upon the keys, the first array comprising a first head array and a first tail array, wherein the first head array stores an initial value of the first link list and the first tail array stores an end value of the first link list;
   populating an array and a link list for each successive digit of the keys based upon the array and link list populated for the preceding digit of the keys, the array comprising a head array and a tail array, wherein the head array stores an initial value of the link list and the tail array stores an end value of the link list; and
   producing a final radix sort of the keys based on a final array and a final link list populated for the final digit of the keys;
   wherein the array stores a portion of the link list values associated with each successive digit.

2. The apparatus of claim 1, wherein reordered keys of incremental sorting steps need not be stored.

3. The apparatus of claim 1, wherein the array and the link list for a successive digit of the keys is used to produce a final radix sorted list of keys.

4. The apparatus of claim 1, wherein the array and the link list store information for determining incrementally sorted key values.

5. The apparatus of claim 1, wherein the link list enables incremental radix sorting based on a prior array rather a sorted, re-ordered stored list of keys.

6. The apparatus of claim 1, wherein the step of populating an array and a link list for each successive digit of the keys is iterated until a final digit of the keys is processed.

7. The apparatus of claim 1, wherein said steps of: receiving a plurality of keys to be sorted in a radix sort; populating an array and a link list for the first digit of the keys based upon the keys; populating an array and a link list for each successive digit of the keys based upon the array and link list populated for the preceding digit of the keys; and producing a final radix sort of the keys based on an array and a link list are implemented on a single field programmable gate array (FPGA)) or application specific integrated circuit (ASIC).

8. The apparatus of claim 1, wherein receiving a plurality of keys comprises receiving the plurality of keys once.

9. An apparatus comprising:
   at least one programmable logic device (PLD) containing programmable circuit elements;
   said programmable circuit elements being configured to:
   receive a plurality of keys to be sorted in a radix sort;
   populate a first array and a first link list for the first digit of the keys based upon the keys, the first array comprising a first head array and a first tail array, wherein the first head array stores an initial value of the first link list and the first tail array stores an end value of the first link list;
   populate an array and a link list for each successive digit of the keys based upon the array and link list populated for the preceding digit of the keys, the array comprising a head array and a tail array, wherein the head array stores an initial value of the link list and the tail array stores an end value of the link list; and
   produce a final radix sort of the keys based on a final array and a final link list populated for the final digit of the keys;
   wherein the array stores a portion of the link list values associated with each successive digit.

10. The apparatus of claim 9, wherein reordered keys of incremental sorting steps need not be stored.

11. The apparatus of claim 9, wherein the array and the link list for a successive digit of the keys is used to produce a final radix sorted list of keys.

12. The apparatus of claim 9, wherein the array and the link list store information for determining incrementally sorted key values.

13. The apparatus of claim 9, wherein the link list enables incremental radix sorting based on a prior array rather a sorted, re-ordered stored list of keys.

14. The apparatus of claim 9, wherein the step of populating an array and a link list for each successive digit of the keys is iterated until a final digit of the keys is processed.

15. The apparatus of claim 9, wherein the PLD is selected from the group comprising a logic programmable field programmable gate array (FPGA) and an application specific integrated circuit (ASIC) fixed-logic chip.

16. The apparatus of claim 9, wherein the at least one programmable logic device (PLD) comprises a plurality of programmable logic devices (PLDs) and each programmable logic device (PLD) receives a subset of the plurality of keys to be sorted in a radix sort, and producing the final radix sort of the keys comprises performing a sort of the results from each programmable logic device (PLD).

17. A computer program product comprising:
   a computer readable storage medium having computer readable program code embodied therewith, the computer readable program code comprising:
   computer readable program code configured to receive a plurality of keys to be sorted in a radix sort;
   computer readable program code configured to populate a first array and a first link list for the first digit of the keys based upon the keys, the first array comprising a first head array and a first tail array, wherein the first head array stores an initial value of the first link list and the first tail array stores an end value of the first link list;
   computer readable program code configured to populate an array and a link list for each successive digit of the keys based upon the array and link list populated for the preceding digit of the keys, the array comprising a head array and a tail array, wherein the head array stores an initial value of the link list and the tail array stores an end value of the link list; and computer readable program code configured to produce a final radix sort of the keys based on a final array and a final link list populated for the final digit of the keys;

wherein the array stores a portion of the link list values associated with each successive digit.

* * * * *